United States Patent [19]
Sa

[11] Patent Number: 5,727,448
[45] Date of Patent: Mar. 17, 1998

[54] ELECTRIC RICE COOKER

[75] Inventor: Yong-Jae Sa, Seoul, Rep. of Korea

[73] Assignee: Daewoo Electronics Co., Ltd., Rep. of Korea

[21] Appl. No.: 807,916

[22] Filed: Feb. 28, 1997

[30] Foreign Application Priority Data

Feb. 28, 1996 [KR] Rep. of Korea .................. 96-3444

[51] Int. Cl.⁶ .................. A47J 27/00; F27D 11/02
[52] U.S. Cl. .................. 99/331; 99/333; 99/403; 99/472; 219/432; 219/433; 219/441; 219/492; 219/494
[58] Field of Search .................. 99/330, 331–335, 99/339, 340, 403, 410–417, 446, 450, 470, 472; 126/369, 376, 377; 219/385, 386, 429, 430–433, 441, 442, 492–494, 497, 509, 510

[56] References Cited

U.S. PATENT DOCUMENTS

| | | | |
|---|---|---|---|
| 4,241,288 | 12/1980 | Aoshima et al. | 219/441 |
| 4,315,138 | 2/1982 | Miwa | 99/333 X |
| 4,362,923 | 12/1982 | Aoshima | 219/492 X |
| 4,421,974 | 12/1983 | Oota et al. | 219/494 X |
| 4,431,906 | 2/1984 | Oota et al. | 99/333 X |
| 4,438,324 | 3/1984 | Narita et al. | 219/433 X |
| 4,441,016 | 4/1984 | Oota et al. | 219/441 |
| 4,455,480 | 6/1984 | Matsumoto et al. | 99/325 X |
| 4,463,249 | 7/1984 | Narita et al. | 219/432 X |
| 4,617,452 | 10/1986 | Miwa | 219/441 |
| 4,625,097 | 11/1986 | Miwa | 219/438 X |
| 4,674,890 | 6/1987 | Kojima et al. | 993/27 X |
| 5,048,400 | 9/1991 | Ueda et al. | 99/331 X |

*Primary Examiner*—Timothy F. Simone
*Attorney, Agent, or Firm*—Cushman Darby & Cushman Intellectual Property Group of Pillsbury Madison & Sutro, LLP

[57] ABSTRACT

Disclosed is an electric rice cooker including an adiabatic vacuum device having an adiabatic function of repressing an outside loss of a heat generated by a hot plate at a minimum and a keeping warm function of continuously maintaining a heat warmly therein. In the electric rice cooker, an outer case has an inner case disposed therein. A cooking kettle disposed inside the inner case for containing water and rice to be cooked. An hot plate mounted adjacent an outside surface of the cooking kettle for heating the cooking kettle. A lid removably covers a top of said cooking kettle. An adiabatic vacuum member mounted between the outer case and the cooking kettle for preventing a heat from being emitting from the cooking kettle to an outside. The electric rice cooker can repress a loss of an internal heat in a cooking kettle at a minimum by means of an adiabatic vacuum member so that a thermal efficiency can increase, and can continuously maintain the internal heat warmly at a keeping warm process.

14 Claims, 6 Drawing Sheets

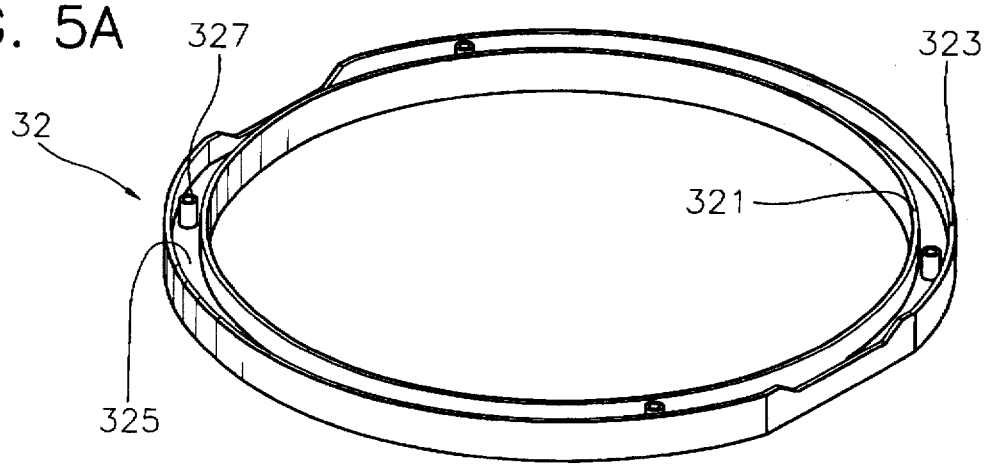
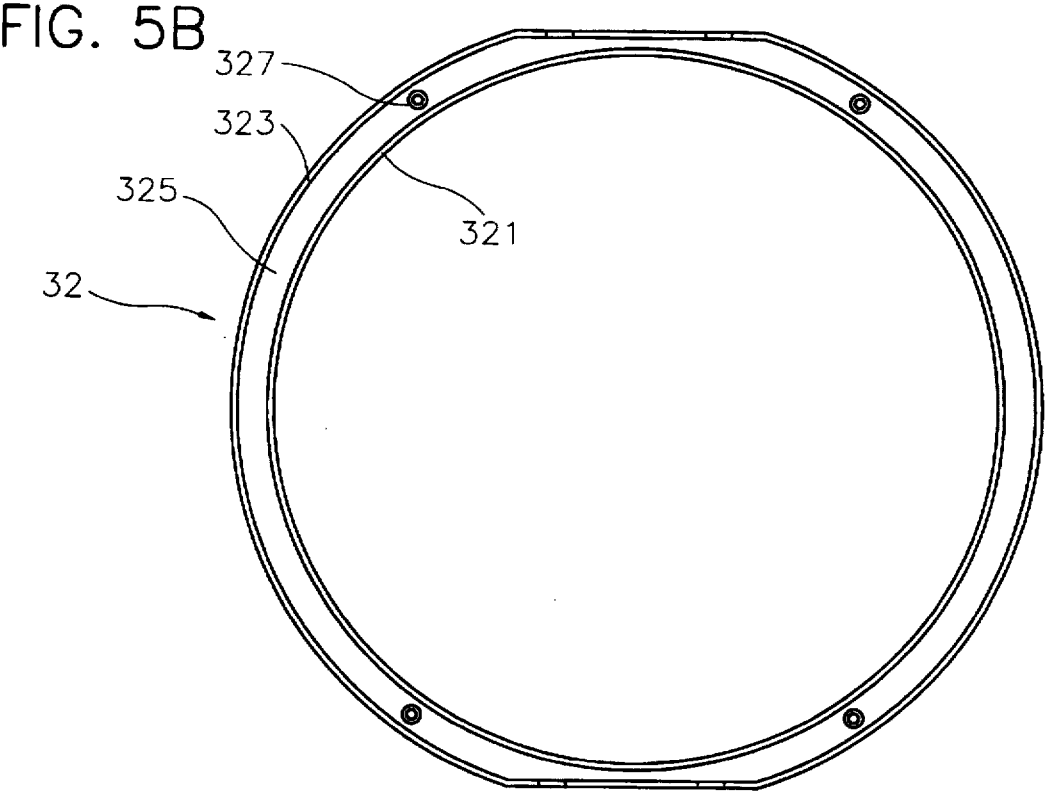
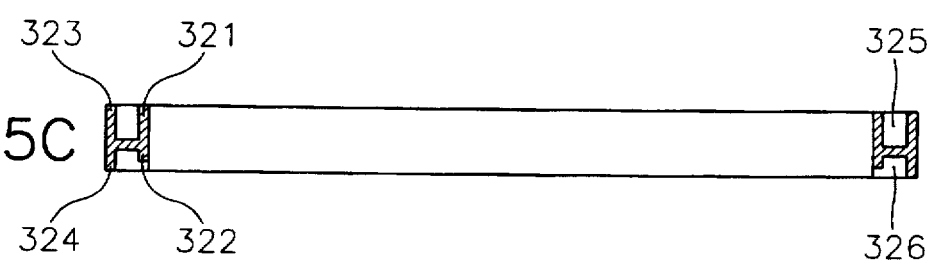

ELECTRIC RICE COOKER

BACKGROUND OF THE INVENTION

1. Field of the Invention

The present invention relates to an electric rice cooker. More particularly, the present invention relates to an electric rice cooker including an adiabatic vacuum device having an adiabatic function of minimizing an outside loss of a heat generated by a hot plate and having a keeping warm function of continuously maintaining a heat therein.

2. Description of the Prior Art

An electric pressure rice cooker having a configuration that is convenient to use, cooks a predetermined amount of a rice and keeps the cooked rice warm by using an electric energy.

As shown in FIG. 1, an electric rice cooker 10 includes an outer cylindrical case 11, an inner cylindrical case 12, and a heat insulating material 13 interposed between the outer cylindrical case 11 and the inner cylindrical case 12. Heat insulating material 13 is made of a urethane foam. A hot plate 14 including a heater 141 is installed at an inside of outer cylindrical case 11. An inner cylindrical case 12 is put on a top of hot plate 14 and is freely drawn in and out cooking kettle 15. Cooking kettle 15 is detachably located in inner case 12 to form a predetermined space 16 therebetween. Cooking kettle 15 and inner kettle 13 are opened and closed by means of an inner lid 17 disposed under an outer lid 18.

In the electric rice cooker constructed as above, a great deal of a heat insulating material should be filled inside outer case 11, so a manufacturing price is raised. Also, the heat insulating material formed by a urethane foam can repress an outside loss of a heat but cannot continuously maintain a warm heat in an inside of cooking kettle 15.

U.S. Pat. No. 4,315,138 (issued to Toshiyuki Miwa on Feb. 9, 1982) discloses one example of an electric rice cooker. U.S. Pat. No. 4,315,138 provides an electric rice cooker which has a heater for preventing heat from being transferred from a heater to a timer. The conventional electric rice cooker includes a heater for heating a kettle and contents therein, an electric timer which controls the energization and deenergization of the heater in response to the temperature of the kettle and a heat isolator for securing the timer and for preventing heat from being transferred from the heater to the timer. The conventional electric rice cooker according to U.S. Pat. No. 4,315,138 can prevent heat from being transferred from the heater to the timer, but it has a disadvantage that it loses a lot of an internal heat in a cooking kettle and it cannot continuously maintain the internal heat warmly.

U.S. Pat. No. 4,241,288 (issued to Toshiyuki Miwa on the date of Feb. 9, 1982) discloses another example of an electric rice cooker. U.S. Pat. No. 4,241,288 provides an electric rice cooker which can boil rice of most excellent taste. The electric rice cooker in accordance with U.S. Pat. No. 4,241,288 includes a cooking kettle for containing water and rice to be cooked, a lid covering the cooking kettle, a heating for heating the cooking kettle, an adiabatic material for supporting and enclosing the heater and the cooking kettle, and a switch for electrically connecting the heater to a source of an electric energy. The electric rice cooker in accordance with U.S. Pat. No. 4,241,288 can boil rice of most excellent taste, but it loses much quantity of an internal heat in a cooking kettle and cannot continuously maintain the internal heat warmly.

SUMMARY OF THE INVENTION

Therefore, an object of the present invention is to provide an electric rice cooker which can minimize a loss of an internal heat in a cooking kettle and can continuously maintain the internal heat warmly.

In order to achieve the above-mentioned object of the present invention, there is provided an electric rice cooker, the electric rice cooker comprising:

an outer case having an inner case disposed therein;

a cooking kettle disposed inside the inner case for containing water and rice to be cooked;

a hot plate mounted adjacent to an outside surface of the cooking kettle for heating the cooking kettle;

a first lid for covering a top of said cooking kettle;

a second lid mounted on a lower portion of said lid; and an adiabatic vacuum member fixed between the outer case and said cooking kettle at said second lid for preventing a heat from being emitted from the cooking kettle to an outside.

The adiabatic vacuum member preferably includes a hollow space therein and an aluminum film in the hollow space. More preferably, the adiabatic vacuum member includes a flange outwardly extending from an edge thereof, a latch formed integrally inward from the flange, and at least one protrusion at a side wall thereof for preventing the side wall from being bent. The electric rice cooker further includes a fixture for fixing the adiabatic vacuum member.

In accordance with the present invention, an adiabatic vacuum member minimizes loss of an internal heat in a cooking kettle so that a thermal efficiency can increase and can continuously maintain the internal heat during a keeping warm process.

BRIEF DESCRIPTION OF THE DRAWINGS

The above objects and advantages of the present invention will become more apparent by describing in detail a preferred embodiment thereof with reference to the attached drawings, in which:

FIG. 5A is a perspective view of a support member shown in FIG. 2;

FIG. 5B is a plan view of the support member shown in FIG. 5A;

FIG. 5C is a cross-sectional view of the support member shown in FIG. 5A; and

DESCRIPTION OF THE PREFERRED EMBODIMENT

A description will be given below in detail, with reference to the accompanying drawings, of an electric cooker according to one embodiment of the present invention.

Figure 1:
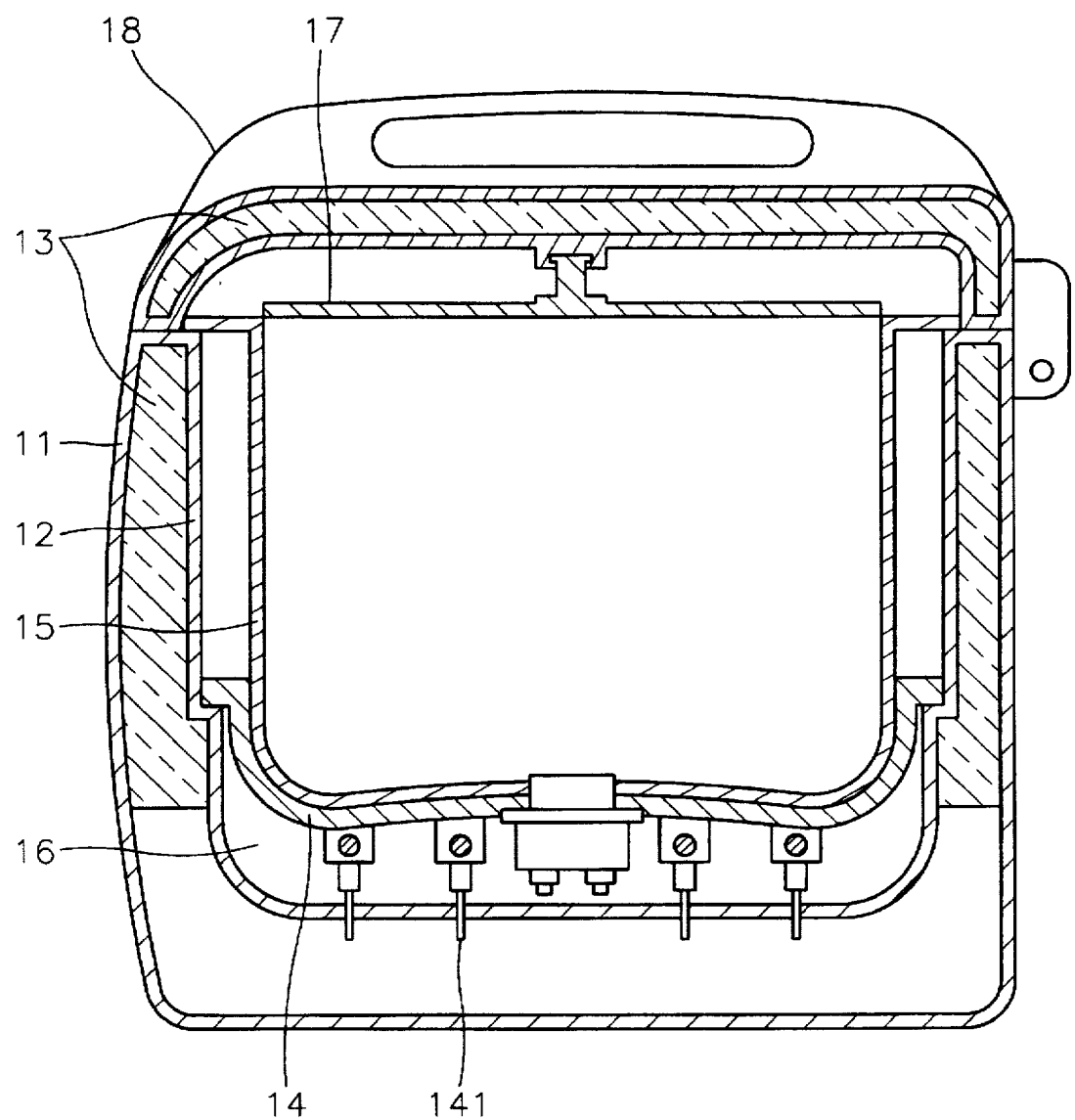
FIG. 1 is a cross-sectional view for show a configuration of a conventional electric rice cooker.
Figure 2:
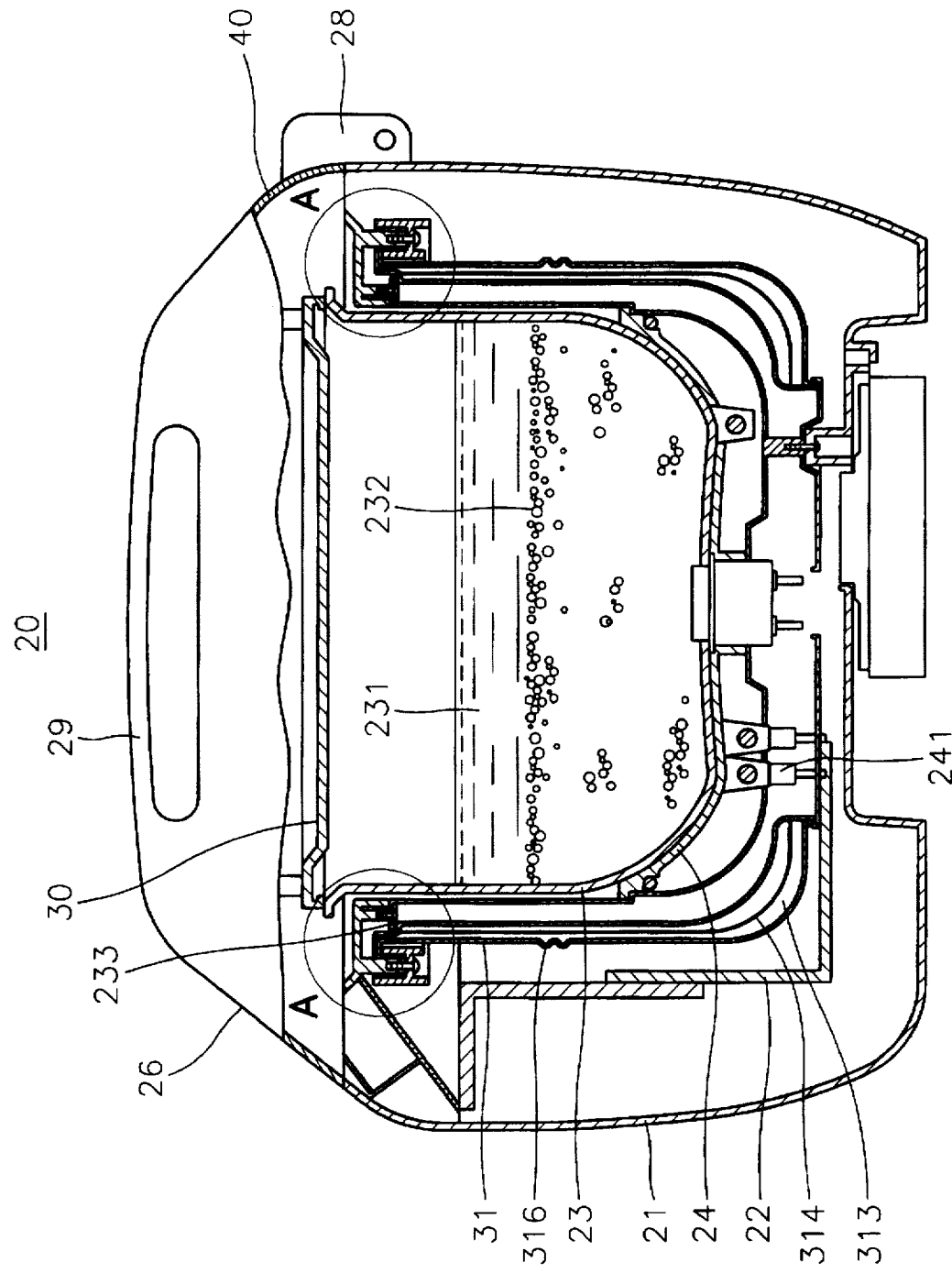
FIG. 2 is a sectional view for showing a configuration of an electric rice cooker according to one embodiment of the present invention.

FIG. 2 shows a configuration of an electric rice cooker according to one embodiment of the present invention. Electric rice cooker 20 includes a cylindrical outer case 21, a cylindrical inner case 22, a cooking kettle 23, a hot plate 24, an outer lid 26, an inner lid 30, a cylindrical adiabatic vacuum member 31, and a middle lid 40. Cylindrical outer case 21 has an open top and a cylindrical inner case 22 disposed therein. Cylindrical inner case 22 is made of good heat conductive material such as aluminum and its surface is treated by, for example chemical polish, to enhance heat reflection.

Cooking kettle 23 which contains water 231 and rice 232 to be cooked, is removably contained in cylindrical inner case 22 with a predetermined gap between the inner bottom surface of cylindrical inner case 22 and the bottom of cooking kettle 23. When cooking kettle 23 is disposed in cylindrical inner case 22, a suitable space or gap is formed between the outer surface of the bottom of cooking kettle 23 and the inner bottom surface of cylindrical inner case 22. Cooking kettle 23 includes a flange 233 which outwardly extends at its upper end so as to be supported by cylindrical adiabatic vacuum member 31. Four tapped holes 234 are formed in flange 233, each being circumferentially apart from adjacent holes by a predetermined degree. Preferably, each of the holes 234 is disposed 90° apart from adjacent holes.

A hot plate 24 is mounted adjacent to an outside surface of cooking kettle 23 and includes electric heater 241. Electric heater 241, for heating cooking kettle 23, is mounted in the gap at suitable distances from cooking kettle 23 and cylindrical inner case 22. Outer lid 26 covering the top opening of cylindrical outer case 21 is formed of, for example, a plastic material, and is rotatably mounted on cylindrical outer case 21 by hinge member 28. A grip portion 29 is integrally formed on a top of outer lid 26.

Figure 3:
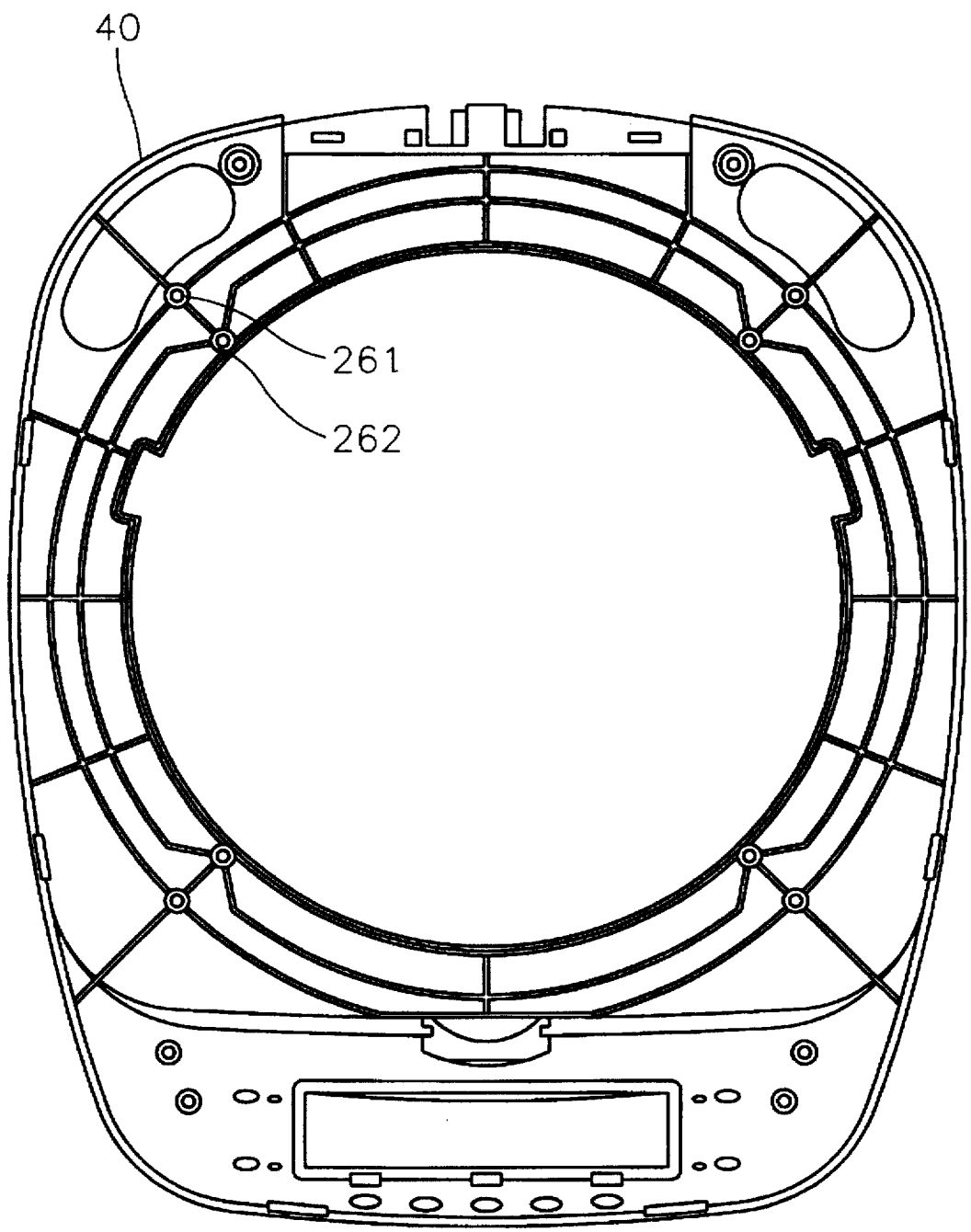
FIG. 3 is a bottom view of a middle lid shown in FIG. 2.

FIG. 3 is a bottom view of middle lid 40 shown in FIG. 2. Four outer tapped-blind-holes 261 are formed at a bottom of middle lid 40, each being circumferentially apart from adjacent holes by a predetermined degree. Preferably, each of the holes 261 is disposed separated by 90° from its adjacent holes. Four inner tapped-blind-holes 262 are formed at a position circumferentially inward from four outer tapped-blind-holes 261 at a bottom of middle lid 40, each being circumferentially apart from adjacent holes by a predetermined degree. Preferably, each of the holes 262 is disposed 90° apart from adjacent holes. An inner lid 30 is constructed to make contact along its outer periphery with the outer periphery of the top opening of cooking kettle 23.

Figure 4A:
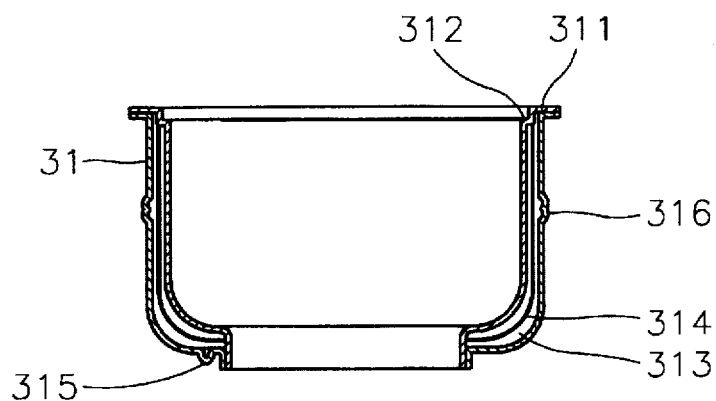
FIG. 4A is a cross-sectional view of an adiabatic vacuum member shown in FIG. 2.
Figure 4B:
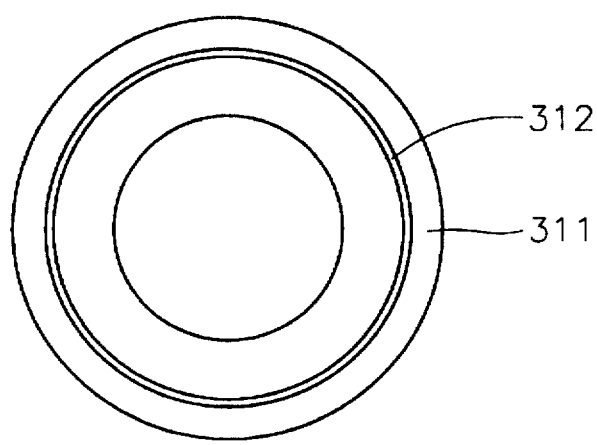
FIG. 4B is an elevational view of the adiabatic vacuum member shown in FIG. 4A.
Figure 4C:
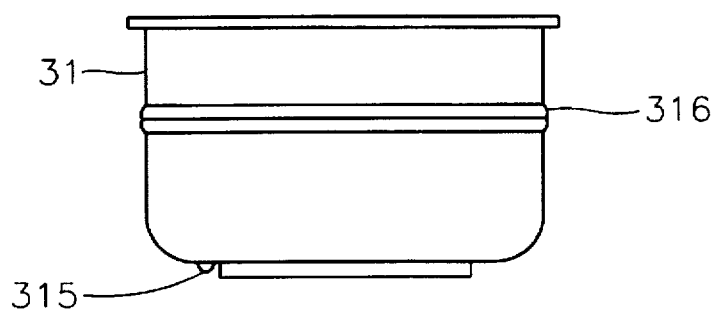
FIG. 4C is a plan view of the adiabatic vacuum member shown in FIG. 4A.

FIGS. 4A to 4C are a cross sectional view, an elevational view, and a plan view of an adiabatic vacuum member shown in FIG. 2, respectively. A cylindrical adiabatic vacuum member 31 is disposed between cooking kettle 23 and middle lid 40. Cylindrical adiabatic vacuum member 31 includes a flange 311 outwardly extending from the edge of the top opening, and a ledge 312 formed integrally formed on a top thereof. Flange 233 of cooking kettle 23 is detachably mounted on ledge 312 of cylindrical adiabatic vacuum member 31. Cylindrical adiabatic vacuum member 31 is made of a stainless steel. A hollow space 313 is formed inside cylindrical adiabatic vacuum member 31 and cylindrical adiabatic vacuum member 31 has an aluminum film 314 for protecting a radiant heat at hollow space 313. Cylindrical adiabatic vacuum member 31 has at least one protrusion 316 at its side wall for preventing the side wall from being bent.

An outlet 315 is formed at a bottom of cylindrical adiabatic vacuum member 31. An air contained at hollow space 313 inside cylindrical adiabatic vacuum member 31 is exhausted through outlet 315 to an outside by means of a vacuum device (not shown) in order to produce a vacuous state in hollow space 313. After hollow space 313 of cylindrical adiabatic vacuum member 31 is vacuumized, outlet 315 is blocked by a solder. Accordingly, cylindrical adiabatic vacuum member 31 has good adiabatic and keep warm efficiency.

FIGS. 5A to 5C are a perspective view, a plan view, and a cross-sectional view of a support member shown in FIG. 2, respectively. A annular support member 32 for supporting hollow cylindrical adiabatic vacuum member 31 has a substantially annular shape having a predetermined thickness along the length thereof. First, upper and lower walls 321 and 322, which respectively extend upward and downward from the inner surface of circle support member 32 along the length of annular support member 32 are respectively and integrally formed in the upper and lower portions thereof. Second upper and lower walls 323 and 324 which respectively extend upward and downward from the inner surface of annular support member 32 along the length of annular support member 32 are respectively and integrally formed in the upper and lower portions thereof. An upper groove 325 is defined by first and second upper walls 321 and 323, and a lower groove 326 is defined by first and second lower walls 322 and 324 in the upper and lower portions of annular support member 32. Four tapped hole 327 are formed in annular support member 32, each being circumferentially apart from adjacent tapped holes by a predetermined degree. Each of the holes 327 are formed parallel to the axis of annular support member 32 so that upper and lower grooves 325 and 326 communicate. Preferably, each of the holes 327 is disposed 90° apart from adjacent holes.

Figure 6:
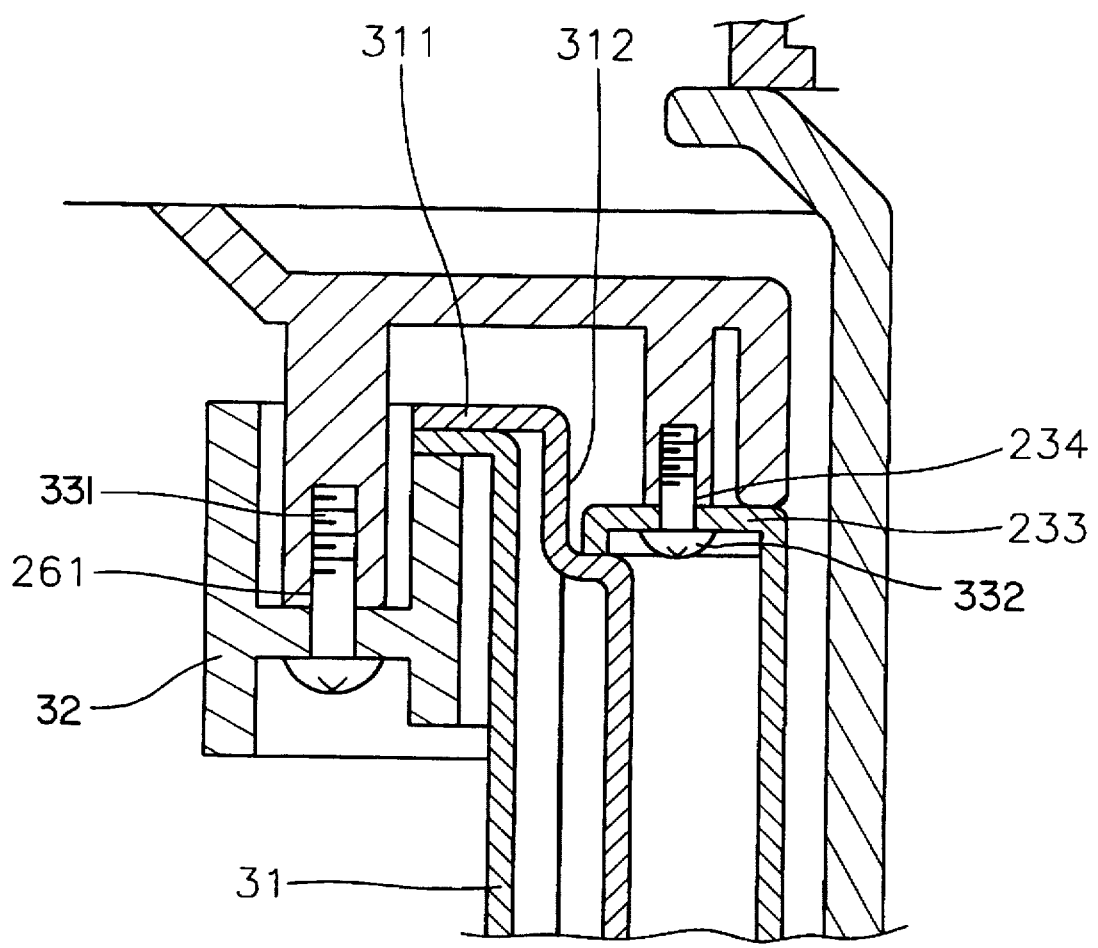
FIG. 6 is an enlarged view of an A portion shown in FIG. 2.

FIG. 6 is an enlarged view of an A portion shown in FIG. 2. Cylindrical adiabatic vacuum member 31 is mounted onto middle lid 40 through outer tapped hole 327 of support member 32 and four outer tapped-blind-holes 261 of middle lid 40 by means of four bolts 331. Four bolts 331 constitute a first locking member 41 for locking middle lid 40 and support member 32. Cooking kettle 23 is mounted onto outer lid 26 through four tapped holes 234 of cooking kettle 23 and four outer tapped-blind-holes 262 of outer lid 26 by means of four bolts 332. Four bolts 332 constitute a second locking member 42 for locking middle lid 40 and cooking kettle 23. Support member 32 and first and second locking members 41 and 42 constitute a fixture 43 for fixing cylindrical adiabatic vacuum member 31.

Hereinafter, an operation of the electric rice cooker will be described. A desired mount of rice 232 to be cooked and a suitable amount of water for cooking it, are contained in cooking kettle 23. After cylindrical adiabatic vacuum member 31 is mounted between cylindrical inner case 22 and cooking kettle 23, hot plate 24 heats cooking kettle 23.

The rice cooking or a keeping warm process is thus performed by the heat from hot plate 24. At this time, a high temperature heat generated inside cooking kettle 23 emits to an outside due to a heat conduction. However, cylindrical adiabatic vacuum member 3 prevents the heat from being emitted from cooking kettle 203 to the outside. Therefore, a heat loss is minimized and the heat from cooking kettle 23 is maintained, so a thermal efficiency is increased and a consumption of an electric energy is reduced.

As described previously, the present invention has an advantage that it can minimize loss of an internal heat in a cooking kettle by means of an adiabatic vacuum member so that a thermal efficiency can increase, and can continuously maintain the internal heat during a keeping warm process.

The invention may be embodied in other specific forms without departing from the spirit or essential characteristics thereof. The present embodiment is therefore to be considered in all respects as illustrative and not respective, the scope of the invention being indicated by the appended claims rather than by the foregoing description and all changes which come within the meaning and range of equivalency of the claims are therefore intended to be embraced therein.

What is claimed is:

1. An electric rice cooker, said electric rice cooker comprising:
    an outer case having an inner case disposed therein;
    a cooking kettle disposed inside the inner case for containing water and rice to be cooked;
    a hot plate mounted adjacent to an outside surface of said cooking kettle for heating said cooking kettle;
    a first lid for covering a top of said cooking kettle;
    a second lid mounted on a lower portion of said first lid; and
    an adiabatic vacuum member fixed between the outer case and said cooking kettle and at said second lid for preventing a heat from being emitted from said cooking kettle to an outside.

2. The electric rice cooker as claimed in claim 1, wherein said adiabatic vacuum member is comprised of stainless steel.

3. The electric rice cooker as claimed in claim 1, wherein said adiabatic vacuum member has a cylindrical shape.

4. The electric rice cooker as claimed in claim 1, wherein said adiabatic vacuum member includes a hollow space therein and an aluminum film in the hollow space.

5. The electric rice cooker as claimed in claim 1, wherein said adiabatic vacuum member includes a flange outwardly extending from an edge thereof, a latch formed integrally inward from said flange, and at least one protrusion at a side wall thereof for preventing the side wall from being bent.

6. The electric rice cooker as claimed in claim 1, further comprising a fixture for fixing said adiabatic vacuum member.

7. The electric rice cooker as claimed in claim 6, wherein said fixture includes a support member for supporting said adiabatic vacuum member and first and second locking members for respectively mounting said support member and said cooking kettle to the outer case.

8. The electric rice cooker as claimed in claim 4, wherein said support member has an annular shape.

9. The electric rice cooker as claimed in claim 4, wherein said first locking member and said second locking member include at least one bolt.

10. An electric rice cooker, said electric rice cooker comprising:
    an outer case having an inner case disposed therein;
    a cooking kettle disposed inside the inner case for containing water and rice to be cooked;
    an hot plate mounted adjacent an outside surface of said cooking kettle for heating said cooking kettle;
    a lid removably covering a top of said cooking kettle;
    an adiabatic vacuum member mounted between the outer case and said cooking kettle for preventing a heat from being emitting from said cooking kettle to an outside; and
    a fixture for fixing said adiabatic vacuum member.

11. The electric rice cooker, as claimed in claim 10, wherein said adiabatic vacuum member is comprised of a stainless steel.

12. The electric rice cooker as claimed in claim 10, wherein said adiabatic vacuum member includes a hollow space therein and an aluminum film at the hollow.

13. The electric rice cooker as claimed in claim 10, wherein said adiabatic vacuum member a flange outwardly extending from the edge thereof, a latch formed integrally formed inward from said flange, at least one protrusion at a side wall thereof for preventing the side wall from being bent.

14. The electric rice cooker as claimed in claim 10, wherein said fixture includes a support member for supporting said adiabatic vacuum member, a first locking member for respectively mounting said support member and said cooking kettle to the outer case.

* * * * *